United States Patent
Hansen et al.

(10) Patent No.: US 11,922,805 B1
(45) Date of Patent: *Mar. 5, 2024

(54) SYSTEMS AND METHODS FOR INTELLIGENT TRAFFIC CONTROL

(71) Applicant: UIPCO, LLC, San Antonio, TX (US)

(72) Inventors: Gregory D. Hansen, San Antonio, TX (US); Will Kerns Maney, San Antonio, TX (US); William P. Culbertson, II, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,246

(22) Filed: Mar. 9, 2023

Related U.S. Application Data (63) Continuation of application No. 16/985,484, filed on Aug. 5, 2020, now Pat. No. 11,610,479.

(60) Provisional application No. 62/882,751, filed on Aug. 5, 2019.

(51) Int. Cl.
| | |
|---|---|
| *G08G 1/01* | (2006.01) |
| *B60W 40/04* | (2006.01) |
| *B60W 60/00* | (2020.01) |
| *G08G 1/015* | (2006.01) |
| *G08G 1/095* | (2006.01) |
| *G08G 1/0967* | (2006.01) |

(52) U.S. Cl.
CPC .......... *G08G 1/0145* (2013.01); *B60W 40/04* (2013.01); *B60W 60/0053* (2020.02); *G08G 1/0112* (2013.01); *G08G 1/0133* (2013.01); *G08G 1/015* (2013.01); *G08G 1/095* (2013.01); *G08G 1/096725* (2013.01); *B60W 2420/42* (2013.01); *B60W 2756/10* (2020.02)

(58) Field of Classification Search
CPC .. G08G 1/0145; G08G 1/0112; G08G 1/0133; G08G 1/015; G08G 1/095; G08G 1/096725; B60W 60/0053; B60W 40/04; B60W 2756/10; B60W 2420/42
See application file for complete search history.

(56) References Cited

U.S. PATENT DOCUMENTS

| | | | |
|---|---|---|---|
| 9,008,890 B1* | 4/2015 | Herbach | G05D 1/0212 |
| | | | 340/436 |
| 9,947,052 B1* | 4/2018 | Slusar | G08G 1/096775 |
| 11,610,479 B1* | 3/2023 | Hansen | B60W 60/0053 |
| 2012/0166076 A1* | 6/2012 | Hardy | G01C 21/3415 |
| | | | 701/414 |
| 2018/0299284 A1* | 10/2018 | Wang | G01C 21/3694 |
| 2019/0092389 A1* | 3/2019 | McGill | B60T 8/17 |
| 2019/0170527 A1* | 6/2019 | Inoue | G01C 21/26 |
| 2019/0206254 A1* | 7/2019 | Tao | B60W 50/14 |
| 2019/0212744 A1* | 7/2019 | Milstein | B60W 30/16 |
| 2020/0020227 A1* | 1/2020 | Ran | G08G 1/075 |

(Continued)

*Primary Examiner* — Hussein Elchanti (74) *Attorney, Agent, or Firm* — BakerHostetler (57) ABSTRACT

An intelligent traffic control system may be configured to manage autonomous vehicle traffic, such as by communicating with autonomous vehicles. The intelligent traffic control system may be configured to output an indication of a traffic control command to autonomous vehicles and non-autonomous vehicles. The intelligent traffic control system may be configured to determine traffic control commands for autonomous vehicles and non-autonomous vehicles.

20 Claims, 5 Drawing Sheets

(56) References Cited

U.S. PATENT DOCUMENTS

2020/0020234 A1* 1/2020 Cheng ................ G08G 1/0112
2020/0207343 A1* 7/2020 Vassilovski ............ G08G 1/164
2020/0239031 A1* 7/2020 Ran ........................ G08G 1/017
2020/0242922 A1* 7/2020 Dulberg ................ G08G 1/012
2020/0388161 A1* 12/2020 Kim ................ G08G 1/096791

* cited by examiner

SYSTEMS AND METHODS FOR INTELLIGENT TRAFFIC CONTROL

CROSS-REFERENCE TO RELATED APPLICATION

This application is a continuation of U.S. patent application Ser. No. 16/985,484, filed Aug. 5, 2020, which claims priority to and the benefit of provisional patent application 62/882,751 filed Aug. 5, 2019, which is incorporated herein by reference in its entirety.

BACKGROUND

The adoption of autonomous vehicles may present several challenges to traditional traffic control systems. As non-autonomous vehicles may still be used and autonomous vehicles may have manned modes, a need for traffic control systems may remain. However, traditional traffic control systems may not be configured to communicate with autonomous vehicles. Furthermore, traditional traffic control systems may not be configured to make traffic control decisions for autonomous vehicle traffic. Therefore, new and more intelligent traffic control systems are needed.

SUMMARY

An intelligent traffic control system may be configured to manage autonomous vehicle traffic, such as by communicating with autonomous vehicles. To coordinate autonomous vehicle traffic and non-autonomous vehicle traffic, including autonomous vehicles operating in manned modes, the intelligent traffic control system may be configured to output an indication of a traffic control command to autonomous vehicles and to non-autonomous vehicles.

An intelligent traffic control system may be configured to determine traffic conditions, such as traffic conditions on a road having autonomous vehicle and/or non-autonomous vehicle traffic. The intelligent traffic control system may be configured to communicate traffic conditions associated with non-autonomous vehicles to autonomous vehicles. Based on the traffic conditions, the intelligent traffic control system may be configured to determine a traffic control command for vehicles on the road.

BRIEF DESCRIPTION OF THE DRAWINGS

The following drawings show generally by way of example, but not by way of limitation, various examples discussed in the present disclosure. In the drawings.

DETAILED DESCRIPTION

As the presence of autonomous vehicles on public roadways increases, there may arise a need to restructure traffic control systems. The present disclosure describes an improved, intelligent traffic control system. The traffic control system may be configured to communicate with autonomous vehicles, as autonomous vehicles may follow traffic patterns based on internal navigation systems. For example, the traffic control system may communicate with autonomous vehicles to issue a traffic control command to the vehicles. The traffic control system may output an indication of the traffic control command via a traffic control device for operators of non-autonomous vehicles and/or autonomous vehicles operating in manned modes that are sharing the roadway with the autonomous vehicles. As another example, the traffic control system may communicate with autonomous vehicles to share information regarding non-autonomous vehicle traffic. The information regarding non-autonomous vehicle traffic may inform the navigation decisions of the autonomous vehicles. As yet another example, the traffic control system may determine a traffic control command based on autonomous vehicle and non-autonomous vehicle traffic.

Furthermore, challenges may be presented by the sharing of roadways by autonomous vehicles and non-autonomous vehicles. Similarly, challenges may be presented by the sharing of roadways by autonomous vehicles operating in manned modes and autonomous vehicles operating in unmanned modes. Although autonomous vehicles may be configured to communicate with each other and/or with a central network and to make traffic decisions based on shared information, operators of non-autonomous vehicles or autonomous vehicles in manned modes may not be privy to the shared information and may not have the benefit of the information when making traffic decisions. Operators may still be reliant on visual cues, such as the sight of surrounding traffic and the sight of commands output by traffic control devices. As a result, there may be a lack of synchronization between autonomous vehicle and non-autonomous vehicle traffic. Therefore, the improved traffic control system may be configured to communicate with autonomous vehicles and operators of non-autonomous and/or manned mode vehicles. The improved traffic control system may be configured to output an indication of a traffic control command to autonomous vehicles and to operators of non-autonomous and/or manned mode vehicles.

Figure 1:
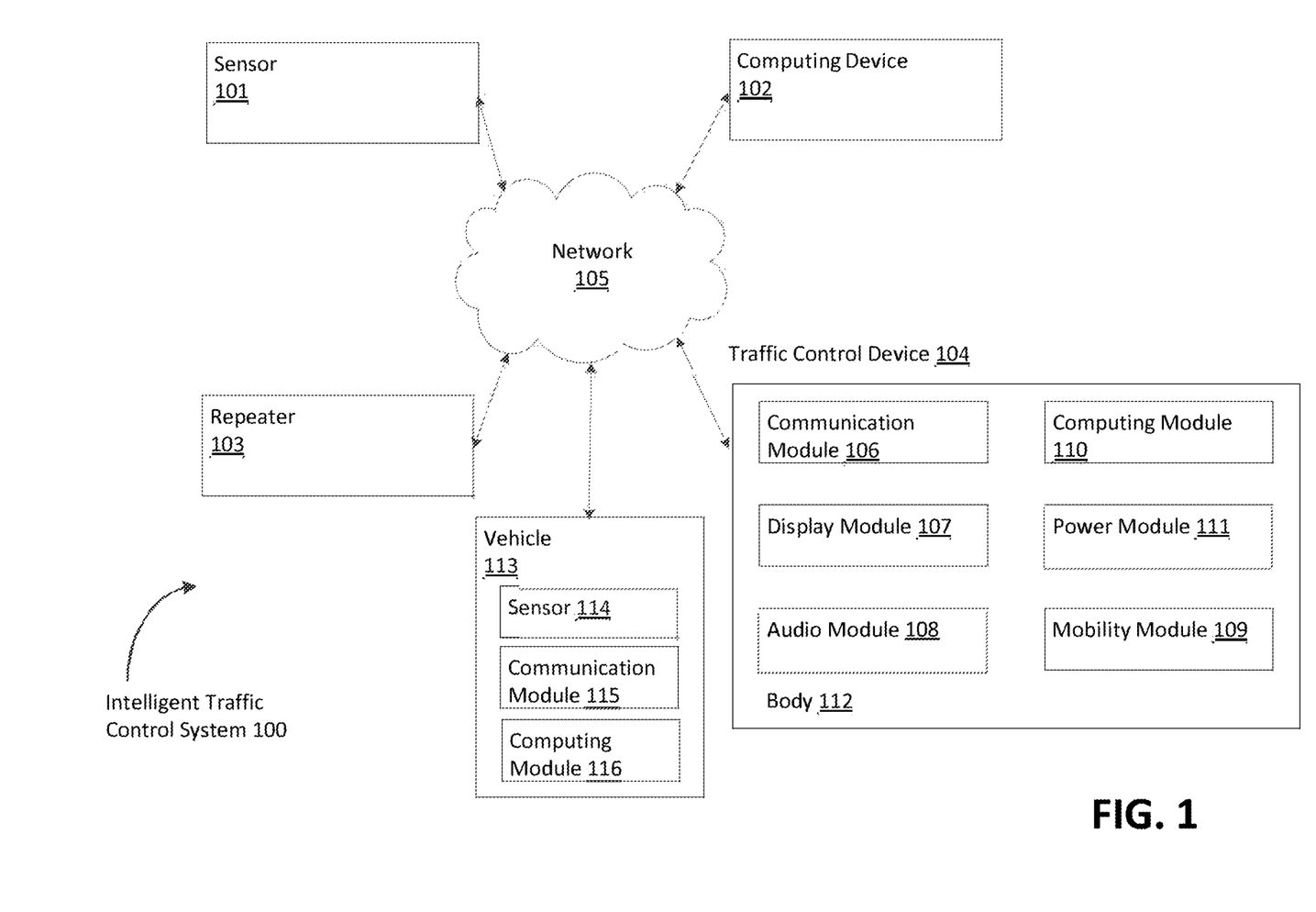
FIG. 1 shows an example intelligent traffic control system.

FIG. 1 shows an intelligent traffic control system 100. The intelligent traffic control system 100 may comprise a plug-and-play system configured to work with existing traffic control cabinets, controllers, or other components. The intelligent traffic control system 100 may comprise one or more sensors 101. The sensor 101 may comprise an intrusive sensor. The intrusive sensor may be installed on a surface, such as of a road or adjacent a road. The intrusive sensor may comprise a magnetic sensor, a piezoelectric sensor, a pneumatic tube sensor, or an inductive coil loop, as examples.

The sensor 101 may comprise a non-intrusive sensor. The non-intrusive sensor may be disposed on and/or over a surface. For example, the non-intrusive sensor may be mounted on a mast or a bridge. The non-intrusive sensor may be located at ground level, such as on a roadside. The non-intrusive sensor may comprise a camera (e.g., a video camera), a radar sensor, an infrared sensor, an ultrasonic sensor, an acoustic sensor (e.g., acoustic array sensors), a road surface condition sensor, and/or a radio-frequency identification (RFID) sensor, as examples.

The sensor 101 may be configured to generate data associated with traffic. The sensor 101 may be configured to generate data associated with a coverage area (e.g., area 201 in FIG. 2) and/or traffic in the coverage area. The sensor 101 may be configured to send the data to another device wirelessly or via a wired medium.

The intelligent traffic control system 100 may comprise a vehicle 113. The vehicle 113 may comprise a car, a truck, a motorcycle, a motor scooter, an electric bike, an electric cart, an all-terrain vehicles (ATV's), and/or an aerial vehicle, as examples. The vehicle 113 may comprise a non-autonomous vehicle. The vehicle 113 may comprise an autonomous vehicle. The autonomous vehicle may have an unmanned mode. The autonomous vehicle may have a manned mode. An operator of the autonomous vehicle may switch between a manned mode and an unmanned mode.

The vehicle 113 may comprise one or more vehicle sensors 114. The vehicle sensor 114 may comprise a safety sensor. The safety sensor may be configured to generate data associated with accident hazards and traffic events, such as in real-time. The safety sensor may comprise a micro-mechanical oscillator, a speed sensor, a camera, a radar beam, a laser beam, a Light Detection and Ranging (LI-DAR) sensor, an inertial sensor, an ultrasonic sensor, a proximity sensor, a night vision sensor, and/or a haptic sensor, as examples.

The vehicle sensor 114 may comprise a diagnostic sensor. The diagnostic sensor may be configured to generate data associated with a status and/or performance of the vehicle 113, such as for detecting malfunctioning of the vehicle 113. The diagnostic sensor may comprise a position sensor, a chemical sensor, a temperature sensor, a gas composition sensor, a pressure sensor, and/or an airbag sensor, as examples.

The vehicle sensor 114 may comprise a traffic sensor. The traffic sensor may be configured to generate data associated with traffic conditions and/or management in an area (e.g., area 201 in FIG. 2). The traffic sensor may comprise a camera, a radar sensor, a LIDAR sensor, an ultrasonic sensor, and/or a proximity sensor, as examples.

The vehicle sensor 114 may comprise an assistance sensor. The assistance sensor may be configured to generate data associated with comfort or convenience, such as of an operator or a passenger of the vehicle 112. The assistance sensor may comprise a gas composition sensor, a humidity sensor, a temperature sensor, a position sensor, a torque sensor, an image sensor, a rain sensor, a fogging prevention sensor, and/or a distance sensor, as examples.

The vehicle sensor 114 may comprise an environment sensor. The environment sensor may be configured to generate data associated with environmental conditions in the vehicle. The environment sensor may comprise a pressure sensor, a temperature sensor, a distance sensor, a camera, and/or a weather condition sensor, as examples.

The vehicle sensor 114 may comprise a user sensor. The user sensor may be configured to generate data associated with health and/or behavior of an operator and/or a passenger of the vehicle 112. The user sensor may comprise a camera, a thermistor, an electrocardiogram (ECG) sensor, an electroencephalogram (EEG) sensor, and/or a heart rate sensor, as examples.

The vehicle 113 may comprise a vehicle communication module 115. The vehicle communication module 115 may be configured to communicate with another vehicle, such as via a communication module of the other vehicle. The vehicle communication module 115 may be configured to communicate with a satellite, such as a Global Positioning System (GPS) satellite. The vehicle communication module 115 may be configured to communicate using Wi-Fi, Bluetooth, Radio Frequency (RF), cellular, broadband, dedicated short range communication (DSRC), IEEE 802.11p, C-V2X/cellular V2X, local interconnect network (LIN), time-triggered light weight protocol (TTP/A), controller area network-bus (CAN-B) protocol, J1850 protocol, media oriented system transport (MOST), digital data bus, Flexray, ZigBee, Ultra-wideband (UWB), and/or another communication protocol. The vehicle communication module 115 may be configured to communicate via a network 105. The network 105 may comprise a wide area network (WAN), a local area network (LAN), a plain telephone service network (PTSN), or another kind of network.

The vehicle communication module 115 may be configured to output an indication of data generated by the vehicle sensor 114. As an example, the vehicle communication module 115 may send an indication of data from the vehicle sensor 114 to another vehicle. As another example, the vehicle communication module 115 may send an indication of data from the vehicle sensor 114 to a cloud computing network.

Data from various vehicles may be aggregated in the cloud computing network. Features and/or characteristics of the vehicles may be known or determined, such as by one or more cloud computing devices. The features and/or characteristics of the vehicles may comprise size, weight, and/or model, as examples. Based on the data from the various vehicles and/or the features and/or characteristics of the vehicles, one or more cloud computing devices may generate one or more maps. The map may comprise a two-dimensional map or a three-dimensional map. The map may comprise environmental data. The map may comprise localization data.

The map may be sent to one or more vehicles, such as to the vehicle 113. Based on the map, the vehicle 113 may be configured to make navigation decisions. For example, the vehicle 113 may comprise a computing module 116. The computing module 116 may comprise memory configured to store instructions, sensor data, communicated data, and/or the map. The computing module 116 may comprise one or more processors configured to execute the instructions. The instructions, when executed by the one or more processors, make cause the computing module 116 to make navigation decisions based on the map.

The intelligent traffic control system 100 may comprise a computing device 102. The computing device 102 may comprise memory configured to store instructions and/or other data. The computing device 102 may comprise a processor configured to execute the instructions. The computing device 102 may comprise a server. The computing device 102 may comprise a cloud computing device, such as a node in a cloud computing network configured to receive and aggregate data from vehicles. The computing device 205 may comprise a controller, such as an electro-mechanical controller, a signal controller, or a solid-state controller.

The computing device 102 may be configured to receive data from the sensor 101. The computing device 102 may be configured to receive data from the vehicle 113. The computing device 102 may be configured to receive data from the sensor 101 and/or the vehicle 113 via the network 105. The computing device 102 may be configured to receive data from the sensor 101 and/or the vehicle 113 via a repeater 103.

The computing device 102 may be configured to communicate with user devices, such as mobile phones, tablet devices, wearable devices, personal computers, and/or internet of things (IoT) devices. The computing device 102 may be configured to communicate with another computing device. The computing device 102 may be configured to communicate with one or more autonomous vehicles, such as the vehicle 113. The computing device 102 may be configured to communicate using Wi-Fi, Bluetooth, Radio Frequency (RF), cellular, broadband, dedicated short range communication (DSRC), IEEE 802.11p, C-V2X/cellular V2X, local interconnect network (LIN), time-triggered light weight protocol (TTP/A), controller area network-bus (CAN-B) protocol, J1850 protocol, media oriented system transport (MOST), digital data bus, Flexray, ZigBee, Ultra-wideband (UWB), and/or another communication protocol. The computing device 102 may be configured to communicate via the network 105. The computing device 102 may be configured to communicate via a wired communication medium.

Figure 2:
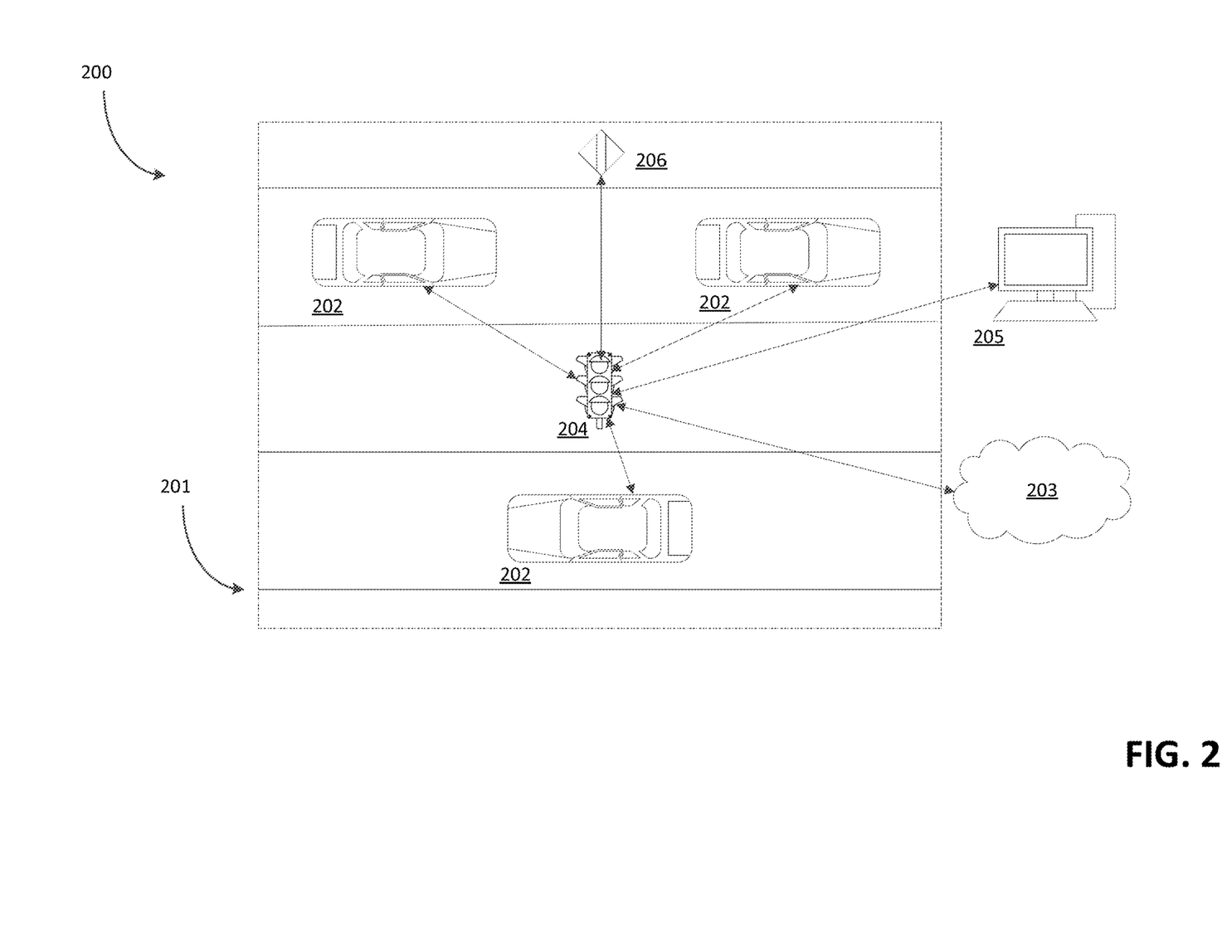
FIG. 2 shows an example traffic control environment.

The computing device 102 may be configured to determine a traffic condition, such as in an area (e.g., area 201 in FIG. 2). The traffic condition may comprise a presence, a number of vehicles, a size (e.g., a length, width, height, weight, etc.), a direction of travel, and/or a speed of vehicles, such as in the area. The traffic condition may comprise a presence of pedestrians and/or number of pedestrians in the area. The traffic condition may comprise a number of autonomous vehicles, a number of non-autonomous vehicles, a number of autonomous vehicles operating in a manned mode, and/or a number of autonomous vehicles operating in an unmanned mode, such as in the area. The computing device 102 may be configured to determine the traffic condition based on data received from the sensor 101, the vehicle 113, another computing device and/or another source, such as a database.

The computing device 102 may be configured to determine a traffic control command. The traffic control command may be for vehicles and/or pedestrians in the area. The traffic control command may comprise a stop command (e.g., a red light), a go command (e.g., a green light), a yield command (e.g., a yellow light or a flashing light), a cross command, and/or a slow command, as examples.

The computing device 102 may be configured to determine different traffic control commands for particular vehicles. For example, the computing device 102 may determine to command a first device to go and a second device to stop. The computing device 102 may determine to command a vehicle operating in a manned mode to switch to an unmanned mode, such as to override a human's operating of the vehicle. For example, the computing device 102 may determine to command a vehicle to switch to an unmanned mode based on dangerous driving behavior. Once the vehicle is operating in the unmanned mode, the computing device 102 may determine a command configured to cause the vehicle to stop in a safe place, to slow down, and/or to operate differently. The computing device 102 may determine to command a vehicle operating in an unmanned mode to switch to a manned mode.

The computing device 102 may be configured to determine the traffic control command based on the traffic condition and/or other data. The other data may comprise data received from the sensor 101, the vehicle 113, another computing device and/or another source, such as a database. The computing device 102 may be configured to determine the traffic control command using a method similar to method 400 in FIG. 4.

The computing device may be configured to output an indication of the traffic control command. The computing device may output the indication of the traffic control command to the vehicle 113, to another computing device, and/or to a traffic control device 104. The computing device may output the indication of the traffic control command via the repeater 103. The computing device may be configured to cause the traffic control device 104 to output an indication of the traffic control command.

The intelligent traffic control system 100 may comprise a traffic control device 104. The traffic control device 104 may comprise all or a portion of the computing device 102. The traffic control device 104 may comprise all or a portion of the sensor 101. The traffic control device 104 may comprise a mobile device, such as a handheld device and/or a user device. The traffic control device 104 may comprise an in-vehicle device, such as a portion of a dashboard of a vehicle and/or a device configured to be mounted on a center console or windshield of a vehicle. The traffic control device 104 may comprise a roadside device, such as a device configured to be deployed on a road, along a road, and/or over a road. The traffic control device 104 may be self-mobile and/or self-propelling, such as a terrestrial drone or an aerial drone.

The traffic control device 104 may comprise a communication module 106. The communication module 106 may be configured to communicate with the vehicle 113. The communication module 106 may be configured to communicate with another traffic control device. The communication module 106 may be configured to communicate with user devices, such as mobile phones, tablet devices, wearable devices, personal computers, and/or internet of things (IoT) devices. The communication module 106 may be configured to communicate with the computing device 102. The communication module 106 may be configured to communicate with the sensor 101. The communication module 106 may be configured to communicate with the repeater 103. The communication module 106 may be configured to communicate with one or more devices associated with government authorities and/or emergency services.

The communication module 106 may comprise a receiver, repeater, transceiver, and/or transmitter. The communication module 106 may be configured to communicate using Wi-Fi, Bluetooth, Radio Frequency (RF), cellular, broadband, dedicated short range communication (DSRC), IEEE 802.11p, C-V2X/cellular V2X, local interconnect network (LIN), time-triggered light weight protocol (TTP/A), controller area network-bus (CAN-B) protocol, J1850 protocol, media oriented system transport (MOST), digital data bus, Flexray, ZigBee, Ultra-wideband (UWB), and/or another communication protocol. The communication module 106 may be configured to communicate via the network 105. The communication module 106 may be configured to communicate via a wired communication medium.

The traffic control device 104 may comprise a display module 107. The display module 107 may comprise a screen. The traffic control device 104 may be configured to output an indication of a traffic control command via the screen. The traffic control command output via the screen may be for vehicle operators and/or pedestrians. The indication of the traffic control command may comprise text. For example, the indication of the traffic control command may comprise the word "go." The indication of the traffic control command may comprise a graphic representation. The graphic representation may comprise a symbol, such as a red polygon or an open palm representing a "stop" command. The graphic representation may comprise an animation, such as an animation of a walking figure representing a "cross" command.

The traffic control device 104 may be configured to output an indication of a warning or information for vehicle operators and/or pedestrians via the screen. The warning or information may comprise a speed limit, an indication of a direction of a travel of a lane and/or other portion of a road, information about traffic density, information about an accident, information about weather, indications of road closures or blocks, and/or indications of pot holes, as examples.

The display module 107 may comprise a light source. The traffic control device 104 may be configured to signal vehicle operators and/or pedestrians using the light source. As an example, the light source may output light in a range of colors, such as red for "stop," yellow for "slow," and green for "go." The intensity and/or brightness of the light source may be determined and/or changed, such as based on the time of day, ambient lighting, weather, location of the traffic control device 104, and/or traffic density.

The traffic control device 104 may comprise an audio module 108. The audio module 108 may comprise an audio output device, such as a speaker. The speaker may be configured to output audio indicating a traffic control command, a warning, and/or information to vehicle operators and/or pedestrians. The commands, warnings, or information may comprise words, music, and/or sounds, as examples. For example, the speaker may output the word "cross" or music when pedestrians may cross a road. As another example, the speaker may output the word "wait," different music, or an alarm bell when pedestrians should not cross the road.

The audio module 108 may comprise an audio input device, such as a microphone or an audio recording device. The audio input device may receive and/or record sound. Based on the received sound, the traffic control device 104 may be configured to execute one or more operations. For example, based on a sound, such as a sound of a vehicle accident being beyond a threshold volume, the traffic control device 104 may send a notification to emergency responders.

The traffic control device 104 may comprise a mobility module 109. The mobility module 109 may be configured to propel and/or move the traffic control device 104. The mobility module 109 may comprise an engine. The mobility module 109 may comprise a motor. The mobility module 109 may be configured to move the traffic control device 104 on the ground. For example, the mobility module 109 may comprise wheels and/or tires. The mobility module 109 may be configured to move the traffic control device 104 in the air. For example, the mobility module 109 may comprise a propeller and/or wings. The traffic control device 104 may be configured to cause the mobility module 109 to move the traffic control device 104 to a determined location, a determined distance, or in a determined direction, as examples.

The traffic control device 104 may comprise a computing module 110. The computing module 110 may comprise one or more processors. The computing module 110 may comprise a memory. The memory may store instructions. When executed by the one or more processors, the instructions may cause the traffic control device 104 to perform operations. The operations may comprise communicating using the communication module 106. The operations may comprise outputting an indication of a traffic control command, a warning, and/or information via the display module 107. The operations may comprise receiving, recording, and/or outputting sound using the audio module 108. The operations may comprise moving the traffic control device 104 using the mobility module 109.

The traffic control device 104 may be configured to determine a traffic condition, such as in an area (e.g., area 201 in FIG. 2). The traffic control device 104 may be configured to determine the traffic condition based on data received from the sensor 101, the vehicle 113, another computing device and/or another source, such as a database.

The traffic control device 104 may be configured to determine a traffic control command. The traffic control device 104 may be configured to determine the traffic control command based on the traffic condition and/or other data. The other data may comprise data received from the sensor 101, the vehicle 113, the computing device 102, and/or another source, such as a database. The traffic control device 104 may be configured to determine the traffic control command using a method similar to method 400 in FIG. 4.

The traffic control device 104 may comprise a power module 111. The power module 111 may be configured to supply power to one or more components of the traffic control device 104, such as the communication module 106, the display module 107, the audio module 108, the computing module 110, and/or the mobility module 109. The power module 111 may comprise a battery. The battery may comprise a replaceable battery. The battery may comprise a rechargeable battery. For example, the battery may be recharged using electricity or solar energy. The power module 111 may receive power from a source external to the traffic control device 104.

The power module 111 may be configured operate in a power-saving mode, such as a sleep mode. For example, the power module 111 may be configured to operate in the power-saving mode based on a density of traffic in an area or a time of day. The power module 111 may be configured to switch from the power-saving mode to a higher power mode, such as a wake mode. For example, the power module 111 may switch power modes based on a time of day, a density of traffic, receiving data, and/or detecting motion, sound, and/or light.

The traffic control device may comprise a body 112. The body 112 may house the communication module 106, the display module 107, the audio module 108, the computing module 110, the power module 111, and/or the mobility module 109. The body 112 may comprise a hard casing, such as a shell, a cabinet, or a box. The body 112 may be configured to protect the communication module 106, the display module 107, the audio module 108, the computing module 110, the power module 111, and/or the mobility module 109. The body 112 may be coupled to and/or disposed on the mobility module 109. For example, the mobility module 109 may be configured to carry and/or move the body 112. The body 112 may be mounted on a support structure, such as a pole, a wire, a cable, or a bar, as examples. The body 112 may be configured to be installed in a vehicle. The body 112 may be configured to be mounted and/or installed on a dashboard, a console, a windshield, and/or a window of a vehicle, as examples. The body 112 may be configured to be mobile, such as to be carried by a user.

The body 112 may be connected to the power module 111. For example the body 112 may receive power from the power module 111 at a connection point on the body 112. The body 112 may be configured to connect to an external power source. For example, the body 112 may comprise a connection point configured to connect to a generator, a solar panel, and/or a power outlet. The body 112 may be configured to supply power from the external power source to the power module 111.

FIG. 2 shows an example operating environment 200. The operating environment 200 may comprise an area 201. The area 201 may comprise any area in which traffic may be controlled. As examples, the area 201 may comprise a square mile, a square quarter mile, or a square eighth mile. The area 201 may comprise a portion of a road. The road may comprise a one-way road or a two-way road, as examples. Although area 201 is shown as a road with two lanes in FIG. 2, the road may comprise any number of lanes (e.g., one lane, three lanes, etc.). The road may comprise a street, a path, a highway, and/or a freeway, as examples.

The area 201 may comprise an intersection of roads or lanes (e.g., an intersection of two roads, three roads, four roads, etc.), an area adjacent to an intersection, and/or an area between two or more intersections, as examples. The area 201 may comprise one or more bike lanes. The area 201 may comprise one or more sidewalks or pedestrian areas. The area 201 may comprise an area between two traffic control devices. The area 201 may comprise an area that is within view and/or range of a camera (e.g., a camera configured to gather traffic data and/or a camera of a traffic control device).

The area 201 may be defined by an area where one or more sensors 206 are located. For example, the area 201 may encompass an array of sensors 206 or a plurality of sensors that generate data used to determine a traffic control command. The area 201 may comprise an area that is within detection range of one or more sensors 206.

The operating environment 200 may comprise one or more vehicles 202. Although FIG. 2 shows three vehicles 202 in the area 201, there may be any number of vehicles 202 in the area 201. The vehicle may be similar to vehicle 113 in FIG. 1. The vehicle 202 may be in communication with a sensor 206, a computing device 205, another vehicle 202, and/or a traffic control device 204.

The operating environment 200 may comprise one or more sensors 206. Although FIG. 2 shows one sensor 206 in the area 201, there may be any number of sensors 206 in the area 201. The sensors 206 may be similar to the sensor 101 in FIG. 1. The sensors 206 may be located in the area 201. The sensors 206 may be located outside the area 201. The sensors 206 may be located in another area adjacent to the area 201. The sensor 206 may be configured to gather data associated with the area and/or traffic in the area 201. The sensor 206 may be in communication with the vehicle 202, a computing device 205, and/or a traffic control device 204.

The operating environment 200 may comprise one or more computing devices 205. The computing device 205 may be similar to the computing device 102 in FIG. 1. The computing device 205 may be located in the area 201. The computing device 205 may be located outside the area 201. The computing device 205 may be located in another area adjacent to the area 201. The computing device 205 may be in communication with the vehicle 202, the sensor 206, another computing device 205, and/or a traffic control device 204.

The operating environment 200 may comprise one or more traffic control devices 204. The traffic control device 204 may be similar to the traffic control device 104 in FIG. 1. The traffic control device 204 may be associated with the area 201. For example the traffic control device 204 may determine and/or output a traffic control command for traffic in the area 201. As another example, a first traffic control device 204 may determine and/or output traffic control commands for traffic going in one direction on a road and a second traffic control device 204 may determine and/or output traffic control commands for traffic going in another direction on the road. The traffic control device 204 may be in communication with the vehicle 202, the sensor 206, the computing device 205, and/or another traffic control device 204. The vehicle 202, the computing device 205, and/or the traffic control device 204 may be configured to communicate via a network 203. The network 203 may be similar to the network 105 in FIG. 1.

The computing device 205 and/or the traffic control device 204 may be configured to determine a traffic condition associated with the area 201. The computing device 205 and/or the traffic control device 204 may determine the traffic condition based on data received from the sensor 206, the vehicle 202, another computing device 205, another traffic control device 204, and/or another source, such as a database.

The computing device 205 and/or the traffic control device 204 may be configured to output an indication of the traffic condition. For example, an indication of a traffic condition associated with non-autonomous vehicles 202 may be communicated to one or more autonomous vehicles 202. An indication of a traffic condition associated with autonomous vehicles 202 may be communicated to one or more non-autonomous vehicles 202. An indication of a traffic condition associated with autonomous vehicles 202 operating in an unmanned mode may be communicated to one or more autonomous vehicles 202 operating in a manned mode. An indication of a traffic condition associated with autonomous vehicles 202 operating in a manned mode may be communicated to one or more autonomous vehicles 202 operating in an unmanned mode.

The computing device 205 and/or the traffic control device 204 may be configured to determine a traffic control command. The traffic control command may be associated with the area 201, such as for pedestrians or vehicles 202 in the area 201. The computing device 205 and/or the traffic control device 204 may determine the traffic control command based on the traffic condition. The computing device 205 and/or the traffic control device 204 may determine the traffic control command based on data received from the sensor 206, the vehicle 202, another computing device 205, another traffic control device 204, and/or another source, such as a database. The traffic control command may be determined using a method similar to method 400 in FIG. 4.

The traffic control device 204 may be configured to output an indication of the traffic control command. The traffic control device 204 may output an indication of the traffic control command to one or more autonomous vehicles 202 and/or autonomous vehicles 202 operating in unmanned modes by sending an indication of the traffic control command to the autonomous vehicles. The traffic control device 204 may be output an indication of the traffic control command to one or more operators of one or more non-autonomous vehicles 202 and/or autonomous vehicles 202 operating in a manned mode. The traffic control device 204 may be configured to output an indication of the traffic control command to the autonomous vehicles 202 and/or autonomous vehicles 202 operating in an unmanned mode and simultaneously output an indication of the traffic control command to the operators of the non-autonomous vehicles 202 and/or the autonomous vehicles 202 operating in a manned mode. As a result, traffic between autonomous vehicles and non-autonomous vehicles may be aligned. For example, the navigation system of an autonomous vehicle may update a driving course and/or pattern based on the traffic control command. An operator may make a driving decision based on the traffic control command.

Figure 3:
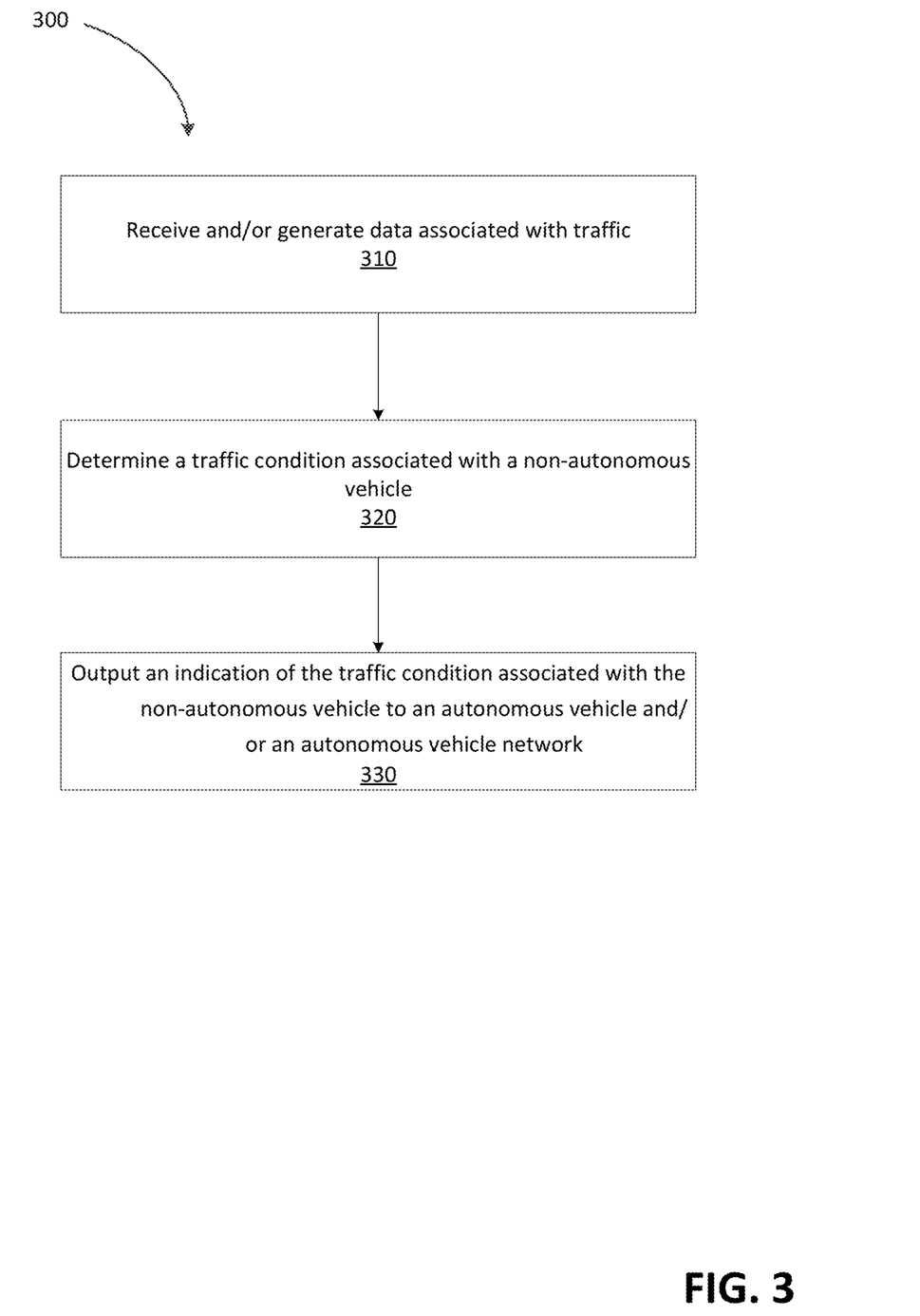
FIG. 3 shows an example intelligent traffic control method.

FIG. 3 shows an example method 300. At step 310, data associated with traffic may be received and/or generated. The data may be generated by and/or received from a sensor (e.g., sensor 101 in FIG. 1 and/or sensor 206 in FIG. 2), a database, a vehicle (e.g., vehicle 113 in FIG. 1 and/or vehicle 202 in FIG. 2), a repeater (e.g., repeater 103 in FIG. 1), a computing device (e.g., computing device 102 in FIG. 1 and/or computing device 205 in FIG. 2), and/or a traffic control device (e.g., traffic control device 104 in FIG. 1 and/or traffic control device 204 in FIG. 2). The data may be generated by and/or received from a cloud computing network, such as a cloud computing network that communicate with autonomous vehicles. The data may be received by a computing device (e.g., computing device 102 in FIG. 1 and/or computing device 205 in FIG. 2) and/or a traffic control device (e.g., traffic control device 104 in FIG. 1 and/or traffic control device 204 in FIG. 2). The traffic data may be received from both sensors and one or more vehicles or vehicles systems (e.g., networks communicating with vehicles and/or aggregating data from vehicles).

The data associated with traffic may be associated with traffic in an area, such as the area 201 in FIG. 2. The data may comprise a sensor reading, such as a measurement of a magnetic field of an induction loop, an air pressure measurement, a laser measurement, and/or a radar measurement. The data may comprise image data. The image data may comprise one or more still images. The image data may comprise video. The image may comprise an aerial image, a ground-level image, or an eye-level image. The image may comprise an image captured from a height and/or position of a camera and/or a traffic control device (e.g., the traffic control device 104 in FIG. 1).

At step 320, a traffic condition associated with one or more non-autonomous vehicles may be determined. The non-autonomous vehicle may be similar to vehicle 113 in FIG. 1 and/or vehicle 202 in FIG. 2. The non-autonomous vehicle may be in an area (e.g., area 201 in FIG. 2). The traffic condition may be determined by the computing device and/or the traffic control device. The traffic condition may be determined based on the traffic data. The traffic condition may be determined based on both traffic data from one or more sensors and traffic data from a vehicle or a vehicle system.

The traffic condition may comprise a number of vehicles in the area. As examples, the number of vehicles in the area may be determined based on traffic data from a pneumatic road tube, inductive loop detector, magnetic sensor, ultrasonic sensor, acoustic array sensor, and/or piezoelectric sensor, as examples. The number of vehicles in the area may be determined based on traffic image data.

The traffic condition may comprise a number of the vehicles in the area that are non-autonomous. The non-autonomous vehicles may be identified based on makes and/or models of the vehicles, license plates on the vehicles, and/or driving patterns of the vehicles. For example, the autonomous vehicles may follow straighter paths or may travel with more consistent velocity than non-autonomous vehicles. As another example, autonomous vehicles may exhibit more consistent braking time or smoother braking than non-autonomous vehicles. The makes and/or models of the vehicles, license plates on the vehicles, and/or driving patterns of the vehicles may be used to determine if the vehicles are autonomous and/or non-autonomous.

The non-autonomous vehicles may be determined based on data indicative of a number of autonomous vehicles in the area. For example, a number of autonomous vehicles, map of autonomous vehicles, and/or other data may be received from a cloud computing network that tracks autonomous vehicles and/or aggregates data from autonomous vehicles. Vehicles may comprise tracking devices that allow GPS coordinates of their locations to be determined. Based on the locations of the vehicles, it may be determined which autonomous vehicles and/or non-autonomous vehicles are in the area. The number of autonomous vehicles may be subtracted from the number of total vehicles to determine the number of non-autonomous vehicles.

The non-autonomous vehicles may be determined based on communicating with one or more vehicles. For example, signals may be sent to the vehicles in the area. The autonomous vehicles may respond to the signals. Based on vehicles not responding to the signals, it may be determined that the vehicles are non-autonomous.

The traffic condition may comprise a speed of travel, direction of travel, and/or trajectory of travel of the non-autonomous vehicle, as examples. For example, the traffic condition may comprise a trajectory of one or more non-autonomous vehicles. For example, a time-space diagram may be generated (e.g., based on positions, velocities, and/or accelerations) for one or more non-autonomous vehicles. The traffic condition may comprise a size (e.g., a length, width, height, weight, etc.) of the non-autonomous vehicles. For example, the size of the non-autonomous vehicles may be determined based on traffic data received from a piezoelectric and/or infrared sensor.

At step 330, an indication of the traffic condition associated with the non-autonomous vehicle may be output. The indication of the traffic condition may be sent to one or more autonomous vehicles. The autonomous vehicle may be similar to vehicle 113 in FIG. 1 and/or vehicle 202 in FIG. 2. The autonomous vehicle may be in the same area as the non-autonomous vehicle. The autonomous vehicle may be in a different area as the non-autonomous vehicle, such as an area in which the non-autonomous vehicle will enter or an area adjacent to the area of the non-autonomous vehicle. The indication of the traffic condition may be output by the computing device and/or the traffic control device. Based on the traffic condition, the autonomous vehicle may determine and/or update a driving pattern or driving decision.

The indication of the traffic condition may be sent to a cloud computing network. The cloud computing network may aggregate the information about the traffic condition with other traffic data. Based on the aggregated data, the cloud computing network may generate a map. The autonomous vehicle may receive the map. The autonomous vehicle may make a traffic decision and/or follow a traffic pattern based on the map. Based on the aggregated data, the cloud computing network may determine a traffic decision and/or a traffic pattern for the autonomous vehicle. The autonomous vehicle may receive an indication of the traffic decision and/or the traffic pattern and may obey the traffic decisions and/or the traffic pattern.

Steps similar to steps 310-330 may be used to determine a traffic condition associated with one or more autonomous vehicles operating in a manned mode. An indication of the traffic condition may be sent to one or more autonomous vehicles operating in an unmanned mode and/or a cloud computing network.

Steps similar to steps 310-330 may be used to determine a traffic condition associated with an autonomous vehicle. An indication of the traffic condition may be sent to a non-autonomous vehicle and/or a device associated with an operator of a non-autonomous vehicle, such as a mobile device. An indication of the traffic condition may be output via the traffic control device. For example, the indication of the traffic condition may be output via a screen of the traffic control device, which may comprise a mobile device, an in-vehicle device, or a roadside device. The indication of the traffic condition may be output audibly via a speaker of the traffic control device.

Figure 4:
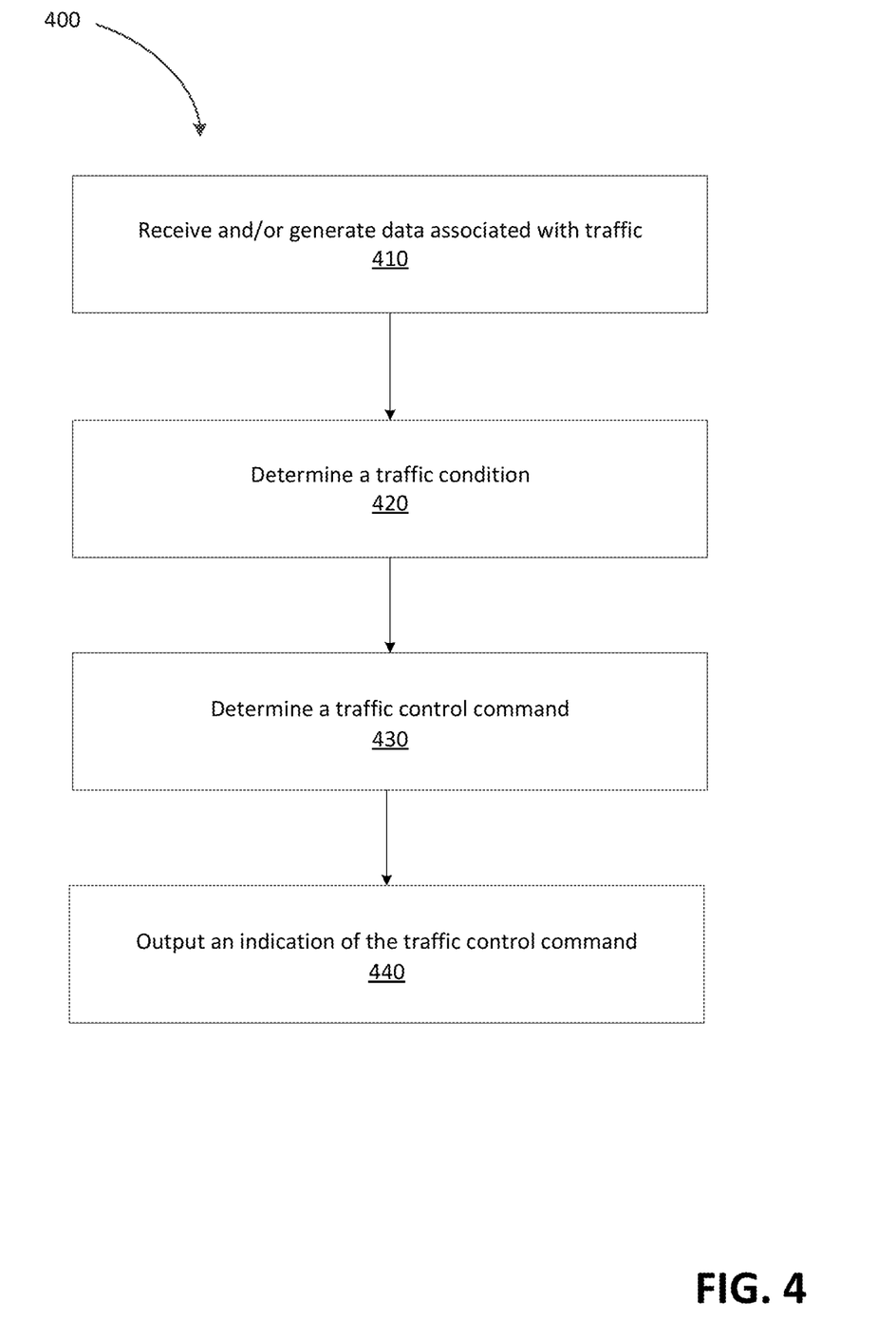
FIG. 4 shows an example intelligent traffic control method.

FIG. 4 shows an example method 400. At step 410, data associated with traffic may be received and/or generated. The data may be generated by and/or received from a sensor (e.g., sensor 101 in FIG. 1 and/or sensor 206 in FIG. 2), a database, a vehicle (e.g., vehicle 113 in FIG. 1 and/or vehicle 202 in FIG. 2), a repeater (e.g., repeater 103 in FIG. 1), a computing device (e.g., computing device 102 in FIG. 1 and/or computing device 205 in FIG. 2), and/or a traffic control device (e.g., traffic control device 104 in FIG. 1 and/or traffic control device 204 in FIG. 2). The data may be generated by and/or received from a cloud computing network, such as a cloud computing network that communicate with autonomous vehicles. The data may be received by a computing device (e.g., computing device 102 in FIG. 1 and/or computing device 205 in FIG. 2) and/or a traffic control device (e.g., traffic control device 104 in FIG. 1 and/or traffic control device 204 in FIG. 2).

The data associated with traffic may be associated with traffic in an area, such as the area 201 in FIG. 2. The data may comprise a sensor reading, such as a measurement of a magnetic field of an induction loop, an air pressure measurement, a laser measurement, and/or a radar measurement. The data may comprise image data. The image data may comprise one or more still images. The image data may comprise video. The image may comprise an aerial image, a ground-level image, or an eye-level image. The image may comprise an image captured from a height and/or position of a camera and/or a traffic control device (e.g., the traffic control device 104 in FIG. 1).

At step 420, a traffic condition may be determined. The traffic condition may be determined based on the data associated with traffic. The traffic condition may be determined by the computing device. The traffic condition may be determined by traffic control device.

The traffic condition may comprise a presence, a number of vehicles, a size (e.g., a length, width, height, weight, etc.), a direction of travel, and/or a speed of vehicles, such as in the area. The traffic condition may comprise a wait time of one or more of the vehicles, such as at an intersection, a stopping point, and/or a traffic control device. The traffic condition may comprise a presence of pedestrians and/or number of pedestrians in the area. The traffic condition may comprise a number of vehicles that are autonomous and/or non-autonomous in the area. The traffic condition may comprise a ratio and/or comparison of the vehicles that are autonomous and the vehicles that are non-autonomous in the area. The number of vehicles that are autonomous and/or non-autonomous in the area may be determined using one or more of the methods described in step 320 of method 300 in FIG. 3. The traffic condition may comprise historical data. The historical data may comprise traffic data related to time, such as a number of vehicles in an area and/or vehicle flow over a period of time or at different times of day.

The traffic condition may comprise a number of autonomous vehicles in the area that are operating in a manned mode and/or a number of autonomous vehicles in the area that are operating in an unmanned mode. The traffic condition may comprise a ratio and/or comparison of the autonomous vehicles that are operating in a manned mode and the autonomous vehicles that are operating in an unmanned mode in the area. The number of vehicles in the area that are operating in a manned mode and/or the number of vehicles in the area that are operating in an unmanned mode may be determined based on one or more signals received from one or more of the vehicles. For example, a signal may be received from one or more of the vehicles indicating that they are operating in a manned mode and/or an unmanned mode. The number of vehicles in the area that are operating in a manned mode and/or the number of vehicles in the area that are operating in an unmanned mode may be determined based on communications received from a computing device (e.g., an autonomous vehicle network computer), and/or the image data. The signal may be received in response to a request sent to the vehicle.

The traffic condition may comprise vehicle movement phases. A phase may comprise a vector indicating a direction of movement of one or more vehicles. A phase may be associated with traffic in a direction. For example, on a road with traffic going in two opposite directions, there may be two phases. At a T-junction, there may be three phases. Phases may also be determined for non-vehicle movement, such as pedestrian movement, tram movement, and/or bicycle movement. The determination of the traffic control command may comprise determining a stage. A stage may comprise a group of phases, such as non-conflicting phases.

Priorities may be determined for the phases. For example, on a two-way street, a phase associated with one direction may be given a first priority and a phase associated with traffic in another direction (e.g., an opposite direction) may be given a second priority. At a junction or an intersection, a first phase may be given a first priority, a second phase may e given a second priority, a third phase may be given a third priority, etc.

The priorities of the phases may be determined based on a number of vehicles associated with one or more phases. A priority may be determined based on a number of autonomous vehicles associated with the phase. A priority may be determined based on a number of non-autonomous vehicles associated with the phase. A priority may be determined based on a number of autonomous vehicles operating in a manned mode associated with the phase. A priority may be determined based on a number of autonomous vehicles operating in an unmanned mode associated with the phase. For example, a phase having more vehicles or more of a type of vehicles than another phase may be given a higher priority or a lower priority than the other phase.

The priorities of the phases may be determined based on a velocity of one or more vehicles associated with a phase. A priority may be determine based on a wait time of vehicles associated with the phase. The priority may be determine based on a time of day. The priority may be determined based on historical data. For example, it may be determined that there is more traffic in a direction on a roadway at a time than at other times. A phase associated with the increased traffic may be given a higher priority than other phases.

Determining the traffic condition may comprise generating a map of autonomous vehicles or a trajectory of one or more vehicles (e.g., based on velocity of one or more vehicles). Determining the traffic condition may comprise generating a time-space diagram for autonomous vehicles and/or non-autonomous vehicles, such as based on the positions, velocities, accelerations of the vehicles.

At step 430, a traffic control command may be determined. The traffic control command may be determined based on the traffic condition. The traffic control command may be determined based on the data associated with the traffic. The traffic control command may be associated with the area, such as for vehicles and/or pedestrians in the area. The traffic control command may comprise a stop command (e.g., a red light), a go command (e.g., a green light), a yield command (e.g., a yellow light or a flashing light), a cross command, and/or a slow command, as examples. The traffic control command may comprise a speed limit. The traffic control command may comprise a warning. As examples, the warning may comprise a warning about a road closure, an accident, and/or construction.

The traffic control command may comprise a duration of a command. For example, it may be determined that the a "stop" command should be output for a duration of 45 seconds. As an illustrative example, the traffic condition may comprise a wait time at an intersection having traffic in orthogonal paths. The traffic condition may comprise a number of vehicles in each path. If a number of vehicles and/or a wait time exceeds a threshold value, a determination may be made to give traffic in one of the paths a "go" command and give traffic in the other path a "stop" command. The determination may be made based on a weighted function (e.g., an average or a sum). For example, variables of the weighted average or sum may comprise a number of vehicles and/or a wait time. A path that has more autonomous vehicles (e.g., a total number of autonomous vehicles, a ratio of autonomous vehicles to non-autonomous vehicles, etc.) may be given priority (e.g., given a right-of-way or a "go" command). Alternatively, a path that has more non-autonomous vehicles may have priority. Alternatively or additionally, pedestrians may have priority.

As an example, if a number of autonomous vehicles, non-autonomous vehicles, autonomous vehicles operating in a manned mode, and/or vehicles operating in an unmanned mode, the traffic control command may be determined. For example, if the number meets or exceeds a threshold number, a first command may be determined. If the number is less than the threshold number, a second command may be determined. As an illustrative example, if there are five or more non-autonomous vehicles in the area, a "go" command may be determined.

The determination of the traffic control command may be adaptive. For example, the traffic control commands may be determined based on current traffic density and/or flow. The determination of the traffic control command may be made using an algorithm configured to minimize delays and/or congestion of vehicle traffic. The determination of the traffic control command may be made using an algorithm configured to maximize the flow of traffic, such as the intelligent driver model (IDM), The determination of the traffic control command may comprise using a predictive model or algorithm. For example, based on historical data, it may be determined that there is more traffic on a road or in one direction at a time of day (e.g., period of time) than other times of day. It may be determined that a "go" command should be output more frequently during that time. As another example, based on a map of autonomous vehicles or based on a trajectory of one or more vehicles (e.g., based on velocity of one or more vehicles), it may be determined that one or more vehicles will be at one location at a time. The traffic control command may be determined based on the trajectory. Based on a time-space diagram, the traffic control command may be determined.

Alternatively, step 420 may be omitted from method 400. For example, the if the traffic data is indicative of the traffic condition, step 430 may be performed without performing step 420. As another example, in step 430, the traffic control command may be determined based on the traffic data and step 420 may be bypassed.

At step 440, an indication of the traffic control command may be output. The indication of the traffic control command may be output by the computing device and/or the traffic control device. The indication of the traffic control command may be sent to one or more autonomous vehicles. The indication of the traffic control command may be sent to an autonomous vehicle via wireless communication. The indication of the traffic control command may be sent to an autonomous vehicle via a beacon. Based on the traffic control command, the autonomous vehicle may determine and/or update a driving pattern or driving decision. The autonomous vehicle may send an indication of the traffic control command to a cloud computing network that aggregates autonomous vehicle data and/or communicates with autonomous vehicles.

The indication of the traffic control command may be sent to the cloud computing network, such as by the computing device and/or the traffic control device. The cloud computing network may aggregate the traffic control command with other traffic data. Based on the aggregated data, the cloud computing network may generate a map. One or more autonomous vehicles may receive the map. The autonomous vehicle may make a traffic decision and/or follow a traffic pattern based on the map. Based on the aggregated data, the cloud computing network may determine a traffic decision and/or a traffic pattern for the autonomous vehicle. The autonomous vehicle may receive an indication of the traffic decision and/or the traffic pattern and may obey the traffic decisions and/or the traffic pattern.

The indication of the traffic control command may be output to one or more operators of non-autonomous vehicles. The indication of the traffic control command may be output via a display module (e.g., display module 107 in FIG. 1) and/or an audio module (e.g., audio module 108 in FIG. 1). The indication of the traffic control command may be output by the traffic control device. If the indication of the traffic control command comprises a light, an intensity of the light may be determined and/or modified, such as based on time of day, weather, ambient light, location of the traffic control device (e.g., relative to another traffic control device, relative to one or more vehicles, height above ground level, etc.), and/or other factors. The operator may make traffic decisions and/or determine traffic patterns based on the traffic control command.

An indication of the traffic control command may be output to an operator of a non-autonomous vehicle (or an operator of a non-autonomous vehicle operating in a manned mode) and an indication of the traffic control command may be output to an autonomous vehicle (or an autonomous vehicle operating in an unmanned mode) simultaneously. Simultaneously outputting the indication of the traffic control command to the operator of the non-autonomous vehicle and outputting the indication of the traffic control command to the autonomous vehicle may comprise outputting the commands at the same time, within 0.05 second, within 0.1 second, within 0.2 second, within 0.5 second, within 1 second, within 5 seconds, or within 10 seconds, as examples. Communicating the traffic control command to autonomous vehicles and to operators of non-autonomous vehicles may align traffic between non-autonomous vehicles and autonomous vehicles. Communicating the traffic control command to autonomous vehicles operating in an unmanned mode and to operators of autonomous vehicles operating in a manned mode may align traffic between autonomous vehicles operating in an unmanned mode and autonomous vehicles operating in a manned mode.

Traffic control commands output by traffic control devices may be coordinated. For example, a computing device or traffic control device may communicate traffic control commands for traffic control devices to output to cause a cascade of "go" commands or green lights on a roadway. The "go" commands or green lights may be output based on a sequence of traffic control devices on a roadway. The cascade may enable vehicles to proceed through a series of "go" commands or green lights. The commands for each traffic control device to output may be determined based on spacing between the traffic control devices and/or vehicle speeds and/or velocities (e.g., expected speeds and/or velocities).

The indication of the traffic control command may be output by one traffic control device, such as a traffic control device at the area associated with the command, to another traffic control device. For example, a traffic control device may send an indication of the traffic control command to a traffic control device farther down a road. As another example, a traffic control device at a first intersection may send an indication of the traffic control command to a traffic control device at a next intersection. The other traffic control device may determine a traffic control command based on the received indication of the traffic control command. For example, the traffic control devices may communicate and cooperate to make traffic control decisions that minimize traffic delays and increase the flow of traffic.

The traffic control device may determine to move and/or be caused to move. The traffic control device determine to move and/or be caused to move based on the traffic data, the traffic condition, and/or the traffic control command. The traffic control device may determine to move and/or be caused to move based on a location of another traffic control device. For example, the traffic control devices may be configured to be located a distance apart. If one traffic control device moves, another traffic control device may move to maintain the spacing. The traffic control device may determine to move and/or be caused to move based on a density of traffic in the area. For example, the traffic control device may move to an area having a greater density of traffic than another area. The traffic control device may be configured to move on ground, in the air, or on a cable, as examples.

Figure 5:
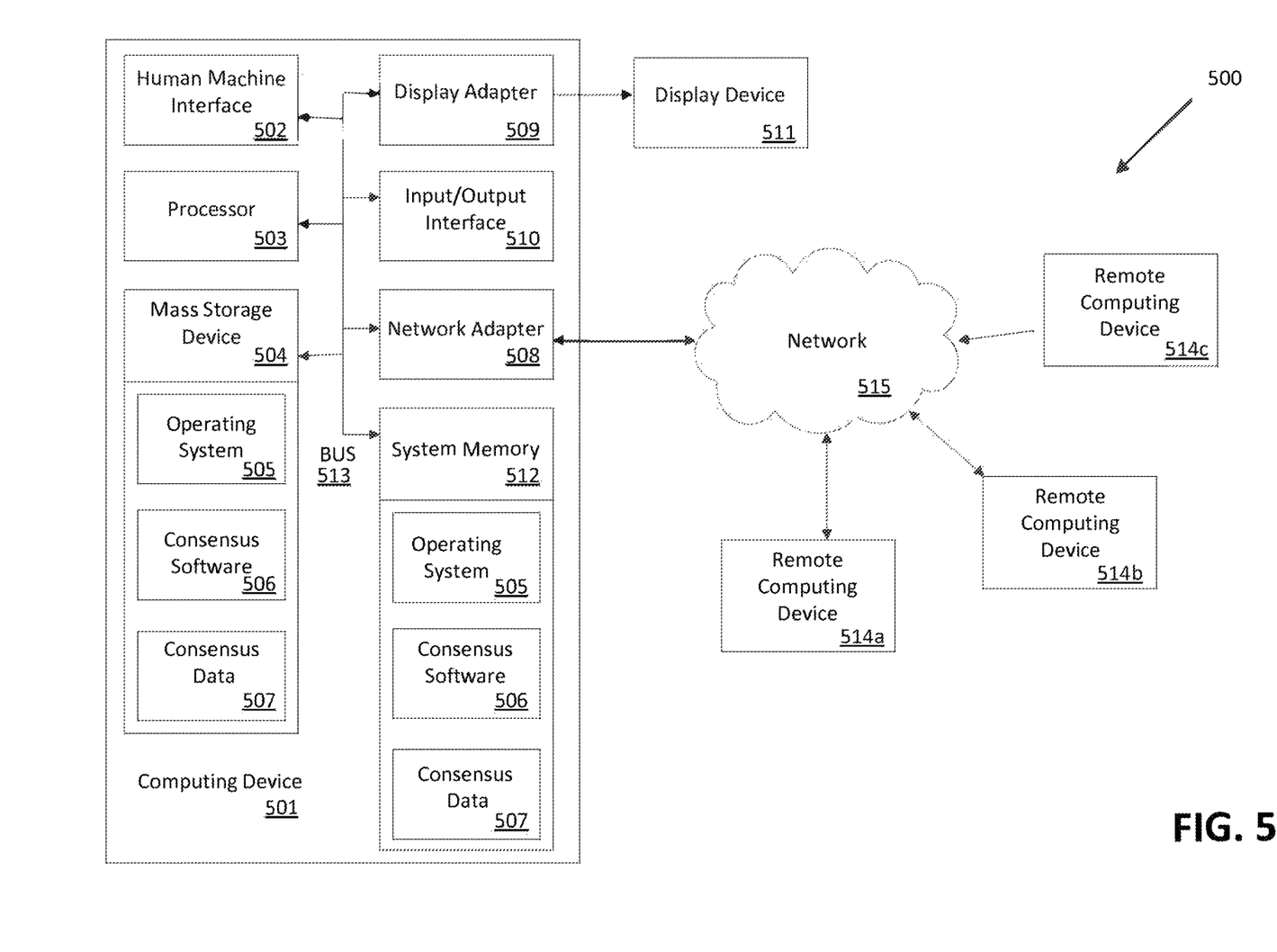
FIG. 5 shows an example computing environment.

FIG. 5 shows an example computing environment. The systems, methods, and apparatuses described herein may be implemented on a computing device such as a computing device 501 (e.g., computer) as shown in FIG. 5 and described below. The computing device 102 and/or the traffic control device 104 in FIG. 1 may be and/or comprise a computing device as shown in FIG. 5. Similarly, the methods, systems, and apparatuses disclosed may utilize one or more computing device to perform one or more functions in one or more locations. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 501. The components of the computing device 501 may comprise, but are not limited to, one or more processors 503, a system memory 512, and a system bus 513 that couples various system components including the processor 503 to the system memory 512. With multiple processors 503, the system may utilize parallel computing.

The system bus 513 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 513, and all buses specified in this description may be implemented over a wired or wireless network connection and each of the subsystems, including the processor 503, a mass storage device 504, an operating system 505, data distillation software 506, data distillation data 507, a network adapter 508, system memory 512, an Input/Output Interface 510, a display adapter 509, a display device 511, and a human machine interface 502, may be contained within one or more remote computing devices 514a,b,c at physically separate locations, connected through buses of this form, in effect implementing a fully distributed system.

The computing device 501 typically comprises a variety of computer readable media. Readable media may be any available media that is accessible by the computing device 501 and comprises both volatile and non-volatile media, removable and non-removable media. The system memory 512 comprises computer readable media in the form of volatile memory, such as random-access memory (RAM), and/or non-volatile memory, such as read only memory (ROM). The system memory 512 typically contains data such as data distillation data 507 and/or program modules such as operating system 505 and data distillation software 506 that are immediately accessible to and/or are presently operated on by the processor 503.

The computing device 501 may comprise other removable/non-removable, volatile/non-volatile computer storage media. FIG. 5 shows a mass storage device 504 which may provide non-volatile storage of computer code, computer readable instructions, data structures, program modules, and other data for the computing device 501. A mass storage device 504 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 504, including an operating system 505 and data distillation software 506. Each of the operating system 505 and data distillation software 506 (or some combination thereof) may comprise elements of the programming and the data distillation software 506. Data distillation data 507 may be stored on the mass storage device 504. Data distillation data 507 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 501 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 503 via a human machine interface 502 that is coupled to the system bus 513 but may be connected by other interface and bus structures, such as a parallel port, game port, an IEEE 594 Port (also known as a Firewire port), a serial port, or a universal serial bus (USB).

A display device 511 may be connected to the system bus 513 via an interface, such as a display adapter 509. It is contemplated that the computing device 501 may have more than one display adapter 509 and the computing device 501 may have more than one display device 511. A display device may be a monitor, an LCD (Liquid Crystal Display), or a projector. Output peripheral devices may comprise components such as speakers (not shown) and a printer (not shown) which may be connected to the computing device 501 via Input/Output Interface 510. Any step and/or result of the methods may be output in any form to an output device. Such output may be any form of visual representation, including, but not limited to, textual, graphical, animation, audio, tactile, and the like. The display 511 and computing device 501 may be part of one device, or separate devices.

The computing device 501 may operate in a networked environment using logical connections to one or more remote computing devices 514a,b,c. A remote computing device may be a personal computer, portable computer, smartphone, a server, a router, a network computer, a peer device or other common network node, and so on. Logical connections between the computing device 501 and a remote computing device 514a,b,c may be made via a network 515, such as a local area network (LAN) and a general wide area network (WAN). Such network connections may be through a network adapter 508. A network adapter 508 may be implemented in both wired and wireless environments. Such networking environments are conventional and commonplace in dwellings, offices, enterprise-wide computer networks, intranets, and the Internet.

Application programs and other executable program components such as the operating system 505 are shown herein as discrete blocks, although it is recognized that such programs and components reside at various times in different storage components of the computing device 501 and are executed by the data processor(s) of the computer. An implementation of data distillation software 506 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information, and which may be accessed by a computer.

What is claimed is:

1. A method comprising:
   receiving vehicle data from a plurality of vehicles operating autonomously;
   determining, based on the vehicle data, one or more characteristics of the plurality of vehicles operating autonomously;
   generating, based on the one or more characteristics and traffic data, trajectories of the plurality of vehicles operating autonomously;
   receiving, by a vehicle of the plurality of vehicles operating autonomously, the generated trajectories;
   determining, based on the traffic data, a traffic condition;
   determining, based on the traffic condition and the one or more determined characteristics, a traffic control command;
   outputting, by a traffic control device, a first indication, configured for the one or more vehicles operating autonomously, of the traffic control command, wherein the vehicle of the plurality of vehicles operating autonomously determines to obey the traffic control command based on the received generated trajectories; and
   outputting, by the traffic control device, a second indication, configured for one or more vehicle operators, of the traffic control command.

2. The method of claim 1, wherein the traffic data is received from at least one of a vehicle, a street sensor, or another traffic control device.

3. The method of claim 1, wherein the traffic data comprises image data.

4. The method of claim 1, wherein the traffic data comprises sensor data.

5. The method of claim 1, wherein the traffic condition comprises a number of vehicles in a traffic area.

6. The method of claim 1, wherein the traffic condition comprise a number of vehicles operating autonomously and a number of vehicles operating in a non-autonomous mode.

7. The method of claim 1, wherein the second indication comprises an audio indication.

8. The method of claim 1, wherein the traffic condition is associated with a traffic area; and wherein at least one vehicle of the one or more vehicles is located outside the traffic area.

9. The method of claim 1, wherein the traffic control command comprises a command to operate in a non-autonomous mode.

10. The method of claim 1, wherein the traffic control command comprises at least one of a stop command, a go command, or a slow command.

11. The method of claim 1, wherein the determining the traffic control command comprises determining a first traffic control command associated with the one or more autonomous vehicles and determining a second traffic control command associated with vehicles operating in a manned mode; and wherein the first indication of the traffic control command comprises an indication of the first traffic control command and the second indication of the traffic control command comprises an indication of the second traffic control command.

12. A traffic control device comprising:
one or more processors; and
memory storing instructions that, when executed by the one or more processors, causes the traffic control device to:
receive vehicle data from a plurality of vehicles operating autonomously;
determine, based on the vehicle data, one or more characteristics of the plurality of vehicles operating autonomously;
generate, based on the one or more characteristics and traffic data, trajectories of the plurality of vehicles operating autonomously;
receive, by a vehicle of the plurality of vehicles operating autonomously, the generated trajectories;
determine, based on the traffic data, a traffic condition;
determine, based on the traffic condition and the one or more determined characteristics, a traffic control command;
output a first indication, configured for the one or more vehicles operating autonomously, of the traffic control command, wherein the vehicle of the plurality of vehicles operating autonomously determines to obey the traffic control command based on the received generated trajectories; and
output, by the traffic control device, a second indication, configured for one or more vehicle operators, of the traffic control command.

13. The traffic control device of claim 12, wherein the traffic control device comprises a mobile device.

14. The traffic control device of claim 12, wherein the traffic control device comprises a self-driving device.

15. A non-transitory computer-readable medium comprising instructions that, when executed, cause operations comprising:
receiving vehicle data from a plurality of vehicles operating autonomously;
determining, based on the vehicle data, one or more characteristics of the plurality of vehicles operating autonomously;
generating, based on the one or more characteristics and traffic data, trajectories of the plurality of vehicles operating autonomously;
receiving, by a vehicle of the plurality of vehicles operating autonomously, the generated trajectories;
determining, based on the traffic data, a traffic condition;
determining, based on the traffic condition and the one or more determined characteristics, a traffic control command;
outputting a first indication, configured for the one or more vehicles operating autonomously, of the traffic control command, wherein the vehicle of the plurality of vehicles operating autonomously determines to obey the traffic control command based on the received one or more generated trajectories; and
outputting a second indication, configured for one or more vehicle operators, of the traffic control command.

16. The transitory computer-readable medium of claim 15, wherein the traffic data, the traffic condition, and the traffic control command are associated with a traffic area.

17. The transitory computer-readable medium of claim 15, wherein the traffic condition comprises at least one of a size, a speed, an acceleration, or a direction of travel of a vehicle.

18. The transitory computer-readable medium of claim 15, wherein the traffic control command comprises an indication of a direction of travel.

19. The transitory computer-readable medium of claim 15, wherein the second indication comprises a visual indication.

20. The transitory computer-readable medium of claim 15, wherein the second indication of the traffic control command is configured to cause a vehicle operating in a manned mode to operate in an unmanned mode.

* * * * *